3,419,707
ROD AND TUBE TEMPERATURE SENSOR FOR CONTROLLING THE HEATING MEANS OF AN OVEN OR THE LIKE
Henry F. Hild and Siegfried E. Manecke, Indiana, Pa., assignors to Robertshaw Controls Company, Richmond, Va., a corporation of Delaware
Filed Mar. 7, 1966, Ser. No. 532,465
20 Claims. (Cl. 219—391)

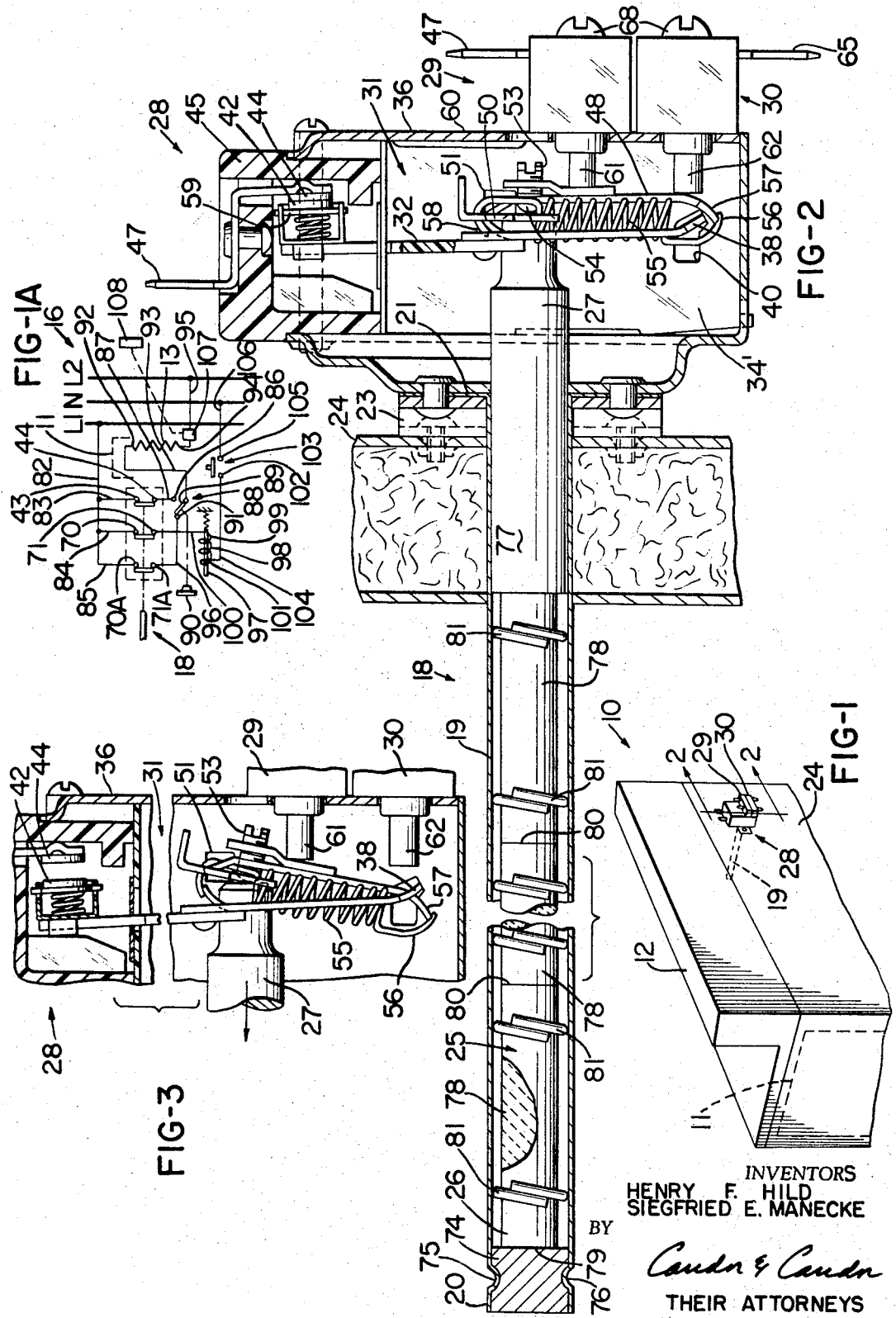

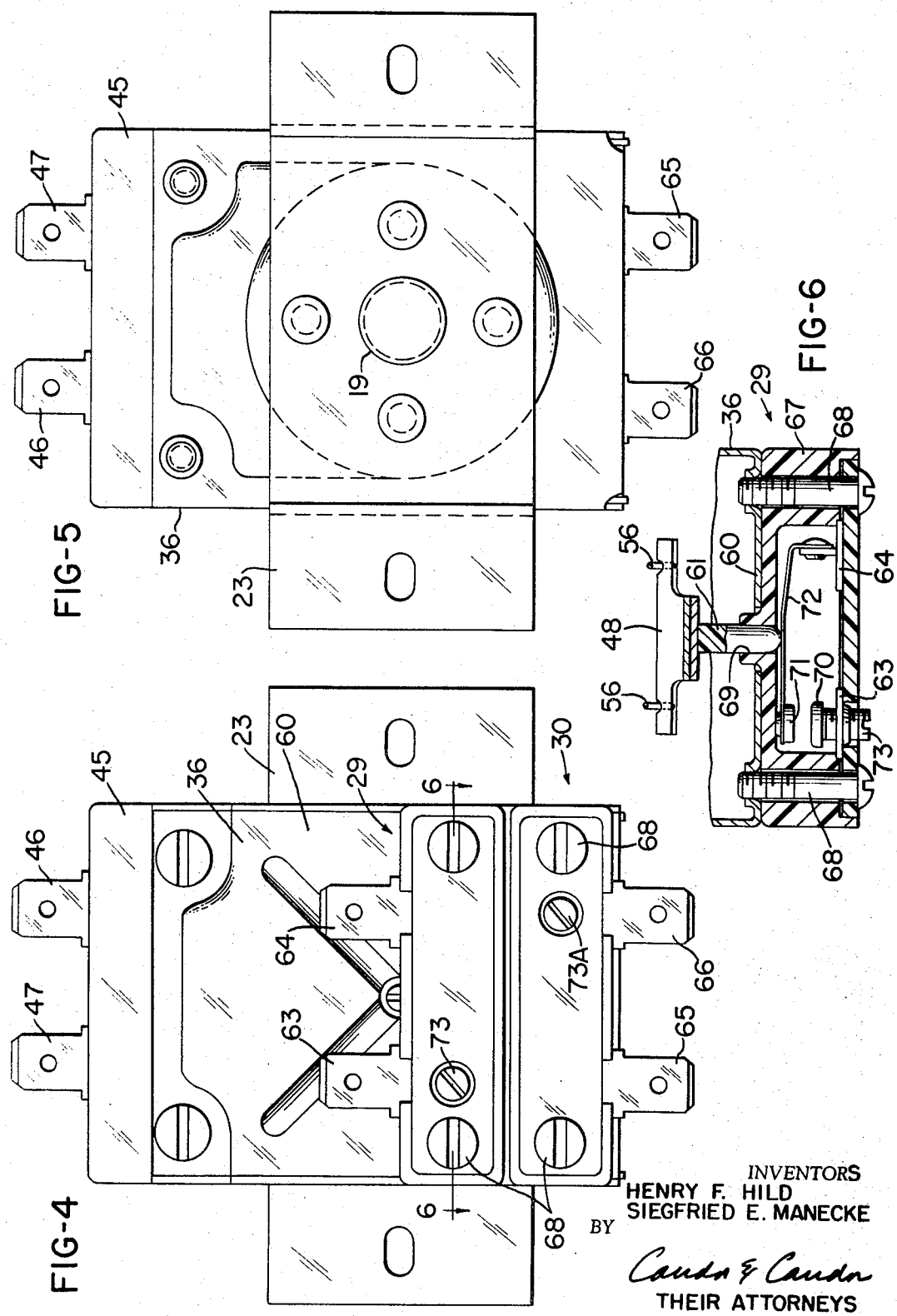

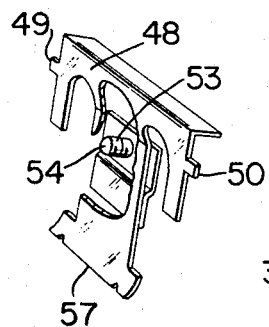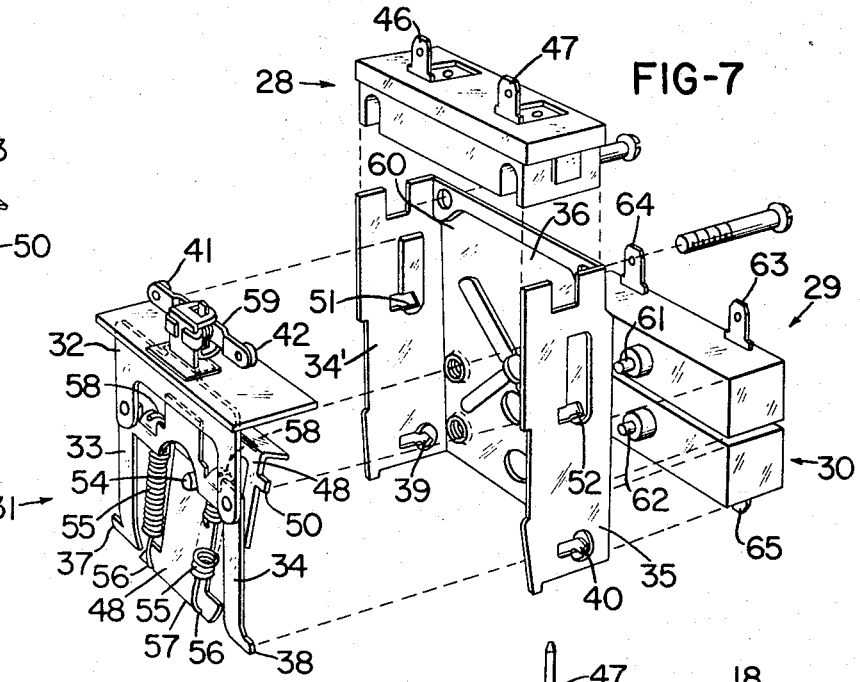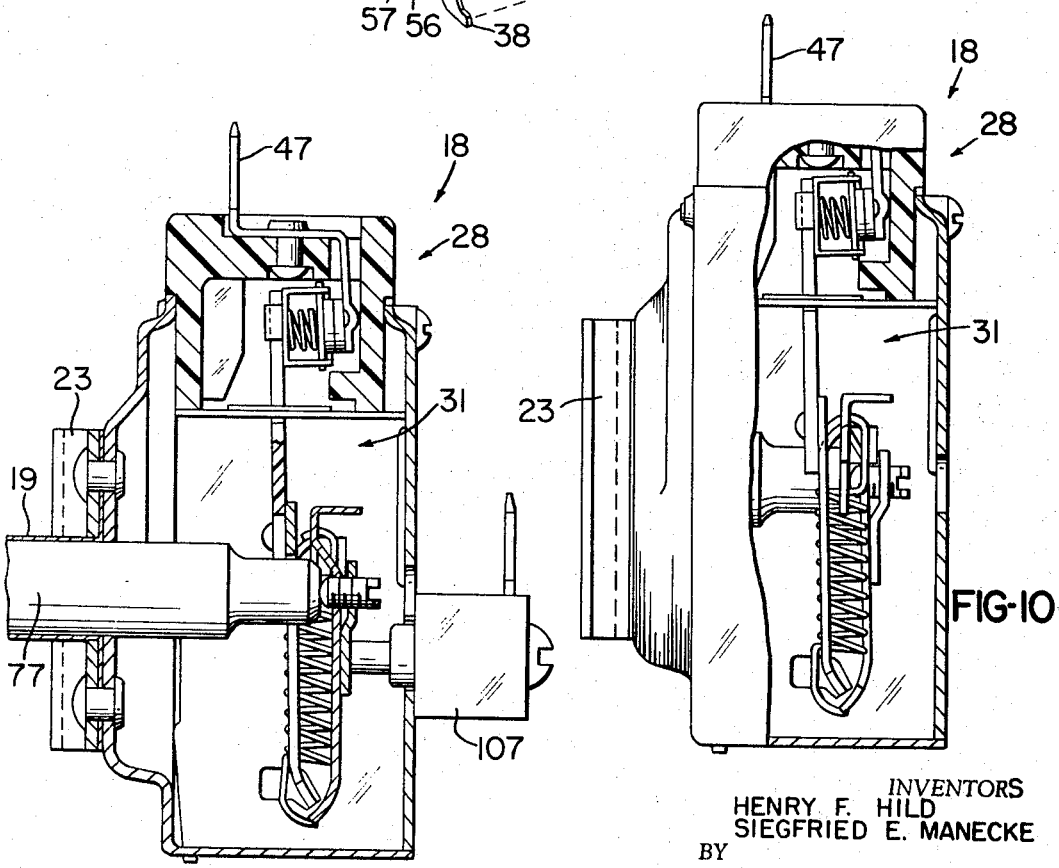
INVENTORS
HENRY F. HILD
SIEGFRIED E. MANECKE
BY
*Cauden & Cauden*
THEIR ATTORNEYS United States Patent Office 3,419,707
Patented Dec. 31, 1968

ABSTRACT OF THE DISCLOSURE

A rod and tube temperature sensing means for an oven wherein the free end of the rod operates a lever means that is adapted to control three different electrical switches, one of the electrical switches controlling the heating means of the oven during a normal cooking operation and a second electrical switch controlling the heating means during a high temperature burn-off cleaning operation of the oven whereas the third electrical switch controls a door latching mechanism to lock the oven door in its closed position during the high temperature burn-off cleaning operation.

---

This invention relates to an improved control means for a cooking apparatus or the like as well as to improved parts for such a cooking apparatus or the like.

It is well known that various appliance manufacturers are producing cooking apparatus for the home or the like wherein the cooking oven is adapted to be controlled for various types of automatic cooking operations thereof, for automatic non-cooking and warmth retaining operations thereof and for relatively high temperature oven burn-off cleaning operations thereof.

It has been found, according to the teachings of this invention, that because of the wide range of temperatures being required for such an oven during the above different operations thereof, prior known temperature sensing means have prevented accurate control of the same and/or such prior known temperature sensing means are relatively complicated and expensive for controlling such temperature ranges.

However, according to the teachings of this invention, an improved oven control system is provided wherein certain operating conditions of the oven or the like are controlled by the temperature sensed by a novel temperature sensing unit of this invention.

In particular, this invention provides a system wherein a rod and tube temperature sensing unit can be utilized to control the cooking apparatus during the high temperature burn-off cleaning operation thereof and/or during the noncooking and warmth retaining operation thereof, the rod and tube unit being relatively simple to manufacture and being uniquely interconnected to the apparatus to provide the above operations in a manner hereinafter described.

Accordingly, it is an object of this invetnion to provide an improved control means for a cooking apparatus or the like, the control means of this invention having one or more of the novel features set forth above or hereinafter shown or described.

Another object of this invention is to provide an improved part for controlling the operation of a cooking apparatus or the like, the improved part of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a fragmentary perspective view of the rear portion of a conventional cooking apparatus utilizing the various features of this invention.

FIGURE 1A is a schematic view illustrating the control system of this invention.

FIGURE 2 is an enlarged, cross-sectional view taken on line 2—2 of FIGURE 1 and illustrates the rod and tube temperature sensing unit of this invention.

FIGURE 3 is a fragmentary cross-sectional view similar to FIGURE 2 and illustrates the unit of FIGURE 2 in another operating position thereof.

FIGURE 4 is a rear view of the unit of FIGURE 2.

FIGURE 5 is a front view of the unit of FIGURE 2.

FIGURE 6 is a fragmentary cross-sectional view taken on line 6—6 of FIGURE 4.

FIGURE 7 is an exploded perspective view of certain of the parts of the unit of FIGURE 2.

FIGURE 8 is a fragmentary, partially broken away view of one of the parts of the unit of FIGURE 7.

FIGURES 9 and 10 are views similar to FIGURE 2 and respectively illustrate other embodiments of this invention.

While the various features of this invention are hereinafter described and illustrated as being particularly adaptable for providing the control means for electrical heater means, it is to be understood that the various features of this invention can be utilized singly or in any combination thereof to provide control means for other types of heater means, such as gas burning heating means or the like, as desired.

Therefore, this invention is not to be limited to only the embodiment illustrated in the drawings, because the drawings are merely utilized to illustrate one of the wide variety of uses of this invention.

Referring now to FIGURE 1, the improved control means and parts of this invention are adapted to control various operations of a conventional cooking apparatus, such as the domestic free-standing range 10 illustrated schematically in FIGURE 1 which has an oven 11 therein and a control panel means 12.

As illustrated in FIGURE 1A, the oven 11 of the cooking apparatus 10 includes a conventional electrical heating means 13 which in the embodiment illustrated in FIGURE 1A comprises an electrically operated heating element 13, the heating means 13 being adapted to be supplied electrical current from a conventional three-wire electrical power source comprising two power lines $L^1$ and $L^2$ and a neutral line N in a manner hereinafter set forth.

The control system of this invention is generally indicated by the reference numeral 16 in FIGURE 1A and includes a temperature sensing tube and rod arrangement 18 for controlling the high temperature burn-off cleaning operation of the oven 11 and/or the low temperature non-cooking and warmth retaining operation of the oven 11 in a manner hereinafter described, the normal cooking operations of the heater means 13 for the oven 11 being by conventional means or other means which do not form part of this invention.

As illustrated in FIGURE 2, the rod and tube temperature sensing unit 18 comprises a tube means 19 having opposed end means 20 and 21, the end means 21 being secured to a frame means 22 with the frame means 22 carrying mounting bracket means 23 to mount the unit 18 against the rear wall or frame means 24 of the cooking apparatus 10. In this manner, the other end means 20 of the tube means 19 projects into the oven 11 to sense the temperature thereof in a manner hereinafter set forth.

A rod means 25 is disposed in the tube means 19 and has one end means 26 adapted to move in unison with the end means 20 of the tube means 19 in a manner hereinafter described while the other end means 27 of the rod means 25 projects out through the opened end 21 of the tube means 19 for a purpose hereinafter described.

The frame means 22 of the unit 18 is adapted to carry a plurality of electrical switches to be operated in accordance with the movement of the end means 27 of the rod means 25 in the manner hereinafter described, the embodiment of the unit 18 in FIGURE 3 including three electrical switches generally indicated by the reference numerals 28, 29 and 30.

The electrical switch means 28 is adapted to control the high temperature burn-off cleaning operation of the oven 11, the electrical switch 29 is adapted to control a safety latch means for the oven door during the high temperature burn-off cleaning operation and the electrical switch 30 is adapted to control the low temperature non-cooking and warmth retaining operation of the oven 11 in a manner hereinafter described. However, it is to be understood that should the switch means 29 be eliminated, the switch means 30 will still operate and conversely should the switch means 30 be eliminated the switch means 29 will still operate in a manner hereinafter described. Also should the switches 29 and 30 or either one of the switches 29 and 30 be eliminated, the switch 28 will still be operative.

The tube means 19 of the unit 18 has a higher coefficient of thermal expansion and contraction than the coefficient of thermal expansion and contraction of the rod means 25 whereby the end means 20 of the tube means 19 will move to the left in FIGURE 2 upon a rise in temperature in the oven 11 and will move to the right in FIGURE 2 upon a decrease in temperature in the oven 11. Since the end means 26 of the rod means 25 follows the movement of the end means 20 of the tube means 19 in a manner hereinafter described and since the rod means 25 has a lower coefficient of thermal expansion and contraction than the tube means 19, the end means 27 of the rod means 25 will move to the left in FIGURE 2 upon the unit 18 sensing an increase in temperature in the oven 11 and will move to the right in FIGURE 2 upon the unit 18 sensing a decrease in temperature in the oven 11 whereby this movement of the end means 27 of the rod means 25 will control the operation of the switch means 28-30 in a manner now to be described.

A lever means 31 is carried by the frame means 22 and operatively interconnects the end means 27 of the rod means 25 with the switch means 28-30.

In particular, the lever means 31 includes a first lever member 32 having a pair of legs 33 and 34 respectively pivotally mounted to opposed walls 34 and 35 of a casing means 36 by outwardly directed tangs 37 and 38 thereof being received in pivot slots 39 and 40. The lever member 32 carries a pair of electrical contacts 41 and 42 which move in unison with the lever member 32 and are respectively cooperable with a pair of fixed contacts 43 and 44, FIGURE 1A, carried by housing means 45 of the electrical switch 28 and respectively interconnected to terminals 46 and 47 thereof.

A second lever member 48 is provided and is pivotally mounted to the casing means 36 by having outwardly directed tangs 49 and 50 thereof respectively received in pivot slots 51 and 52 in the side walls 34' and 35 of the casing 36. The lever member 48 carries a threaded adjusting member 53 adapted to be moved inwardly and outwardly relative to the other member 48 and has an end 54 which abuts against the end means 27 of the rod means 25 of the unit 18.

A pair of tension spring means 55 each has one end 56 thereof interconnected to the free end 57 of the lever member 48 and the other end 58 interconnected to the lever member 32 whereby the tension spring means 55 cause the lever member 32 to move with a snap movement during its opening and closing operation of the switch means 28.

The adjusting member 53 can be so adjusted relative to the lever member 48 that when the unit 18 senses a temperature above a predetermined temperature, such as around 950° F. during the oven burn-off cleaning operation, the end means 27 of the rod means 25 has moved to the left in FIGURE 3 such a distance that the tension spring means 55 has caused the lever member 32 to snap to the left and break the electrical connection between the terminals 46 and 47 of the switch means 28 as the contacts 41 and 42 have been respectively moved away from the fixed contacts 43 and 44, the contacts 41 and 42 being electrically connected together by a bridging member 59.

When the temperature of the oven 11 falls below the predetermined high temperature setting for the clean off operation thereof, the end means 27 of the rod means 25 has moved back to the right in FIGURE 2 a distance to cause movement of the lever member 48 so that the tension spring means 55 will snap the lever member 32 back to the right to again electrically interconnect the terminals 46 and 47 together for a purpose hereinafter described.

The electrical switch means 29 and 30 of the unit 18 are detachably secured in piggy-back relation to a rear wall 60 of the casing means 36 and respectively have operating plungers 61 and 62 engageable with the lever member 48.

The switch means 29 has a pair of terminals 63 and 64 and the switch means 30 has a pair of terminals 65 and 66, FIGURE 4.

Since the details and operation of the switch means 29 and 30 are substantially identical, only the structural details of the switch means 29 are illustrated in FIGURE 6 and will now be described.

As illustrated in FIGURE 6, the switch means 29 includes a casing 67 detachably secured to the rear wall 60 of the casing 36 by threaded fastening members 68, the operating plunger 61 thereof passing through an opening 69 in the casing wall 60 to be engageable by the lever member 48 as illustrated. The terminals 63 and 64 of the switch means 29 are respectively electrically interconnected to a normally fixed but adjustable contact 70 and a movable contact 71 whereby when the contacts 71 and 70 are in contact with each other, electrical current can flow between the terminals 63 and 64 for a purpose hereinafter described.

The movable contact 71 of the switch means 29 is carried on a spring blade 72 which has a natural tendency to hold the contact 71 away from the contact 70 in the manner illustrated in FIGURE 6, the spring blade 72 being engageable by the plunger 61 whereby the force of the leaf spring blade 72 maintains the plunger 61 in contact with the lever 48 so that the plunger 61 will follow the movement of the lever 48. The fixed contact 70 is carried on a threaded adjusting member 73 threadedly received through the terminal 63 so that the position of the contact 70 relative to the terminal 63 can be adjusted for determining the particular temperature sensed by the unit 18 that will cause opening and closing of the contacts 70 and 71.

In particular, when the unit 18 is sensing a temperature below a temperature that the oven door latch means should be positively held in its latched position, the end means 27 of the rod means 25 is in such a position to the right in FIGURE 2 that the lever member 48 holds the plunger 61 in such a position that the contact 71 is held in electrical contact with the contact 70 so that the terminals 63 and 64 thereof are electrically interconnected together.

However, when the temperature in the oven 11 rises to approximately 600° F., the end means 27 of the rod means 25 of the unit 18 has moved to the left in FIGURE 2 to such a position that the lever member 48 following the movement thereof permits the plunger 61 to move to the left in FIGURE 6 a distance sufficient to permit the spring blade 72 to move the contact 71 out of electrical contact with the contact 70 so that no electrical current can flow between the terminals 63 and 64 of the electrical switch 29.

The operation and structure of the electrical switch 30 is subsatntially identical to the electrical switch 29 and like parts thereof are indicated by like reference numerals followed by the reference letter A in FIGURE 8 as well as in other figures of the drawings.

Thus, as long as the unit 18 is sensing a temperature below a preselected keep warm and non-cooking temperature, such as 170° F., the plunger 62 of the switch means 30 holds the contact 71A thereof in electrical contact with the contacts 70A to electrically interconnect the terminals 65 and 66 thereof. However, when the unit senses a temperature above 170° F., the lever 48 has moved to cause the contact 71A to move out of contact with the contact 70A to disconnect the electrical connection between the terminals 65 and 66.

As illustrated in FIGURE 2, the rod means 25 of the unit 18 includes a member 74 disposed in the open end 20 of the tube means 19 and secured thereto. In particular, the member 74 has an annular groove 75 in the outer peripheral surface thereof and receives an inwardly deformed annular bead 76 of the tube means 19 to fasten the member 74 and tube means 19 together so that the member 74 will move in unison with the end 20 of the tube means 19.

Another member 77 is disposed in the end 21 of the tube means 19 and is in sliding engagement with the internal peripheral surface thereof, the member 77 forming the end means 27 of the rod means 25 and having a length sufficient to correspond with the entire thickness of the wall means 24 of the cooking apparatus 10 when the unit 18 is mounted thereto in the manner illustrated in FIGURE 2 so that remaining parts of the rod means 25 will only be disposed in the oven 11.

The members 74 and 77 of the rod means 25 are formed of the same material as the material of the tube means 19, such as stainless steel or the like, so that the members 74 and 77 have the same coefficient of thermal expansion and contraction as the coefficient of thermal expansion and contraction of the tube means 19.

A plurality of separate members 78 are disposed between the members 74 and 77 to complete the rod means 25, each member 78 being formed of material having a lower coefficient of thermal expansion and contraction than the coefficient of thermal expansion and contraction of the tube means 19 and having a configuration to permit the same to be disposed out of contact with the internal peripheral surface of the tube means 19. For example, the members 78 each can be substantially cylindrical and uniform in length and have opposed flat ends 79 and 80 disposed in aligned and abutting relation to be held in compacted and aligned relation with the members 74 and 77 by the force of the spring means 55 normally tending to move the lever member 48 to the left in FIGURE 2 regardless of the temperature in the oven 11.

In order to support the members 79 in spaced relation relative to the internal peripheral surface of the tube means 19 and to minimize the heat transfer therebetween, a plurality of coiled wire members 81 are provided with two such members 81 being disposed adjacent the opposed ends 79 and 80 of each rod member 78.

The wire means 81 can be formed of stainless steel and are so coiled that the natural resiliency thereof cause the same to coil against the members 78 and be held in fixed positions on the members 78 so that the tube means 19 can move relative thereto. Since the wire members 81 have substantially circular cross sectional configurations, it can be seen that the spacers 81 provide substantially circular line cross sectional engagement with the internal peripheral surface of the tube means 19 so that heat transferred between the tube means 19 to the ceramic members 78 is held to a minimum.

While the rod and tube temperature sensing unit 18 can be electrically connected to control the heater means 13 of the oven 11 in any desired manner, one schematic illustration thereof is provided by the system 16 of FIGURE 1A and will now be described.

As illustrated in FIGURE 1A, the contacts 43, 70 and 70A of the switch means 28, 29 and 30 are respectively interconnected to a branch lead 82 of the power source lead $L^1$ by leads 83, 84 and 85 through the terminals 37, 63 and 65 of the switch means 28, 29 and 30.

The contact 34 of the switch means 28 is interconnected to a contact 86 by a lead means 87 through the terminal 64, the contact 86 forming part of a manually operated selector switch 88 having a switch blade 89 thereof manually adjusted by a selector knob 90. The selector knob 90 is adapted to position the switch blade 89 against the contact 86 for an oven burn-off cleaning operation, intermediate the contact 86 and another contact 91 of the switch 88 during a normal cooking operation wherein the heater means 13 is controlled by other means than the unit 18 of this invention and against the contact 91 when the unit 18 of this invention is to be utilized for a low temperature non-cooking and warmth retaining operation of the oven 11.

The switch blade 86 of the selector switch 88 is electrically interconnected to one side 92 of the heater means 13 by a lead 93, the other side 94 of the heater means 13 being interconnected to the power source lead $L^2$ by a lead 95.

The contact 71A of the switch means 30 is interconnected to the contact 91 of the selector switch 88 by a lead 96 through the terminal 66 of the switch means 30.

A latch pin 97 is provided for the oven door of the oven 11 and is so constructed and arranged that the door latch member cannot be moved from its door latching position until the latch pin 97 is moved to the right in FIGURE 1A upon a solenoid coil 98 being energized.

One side 99 of the solenoid coil 98 is interconnected to the contacts 71 of the switch means 29 by a lead 100 through the terminal 64 of the switch means 29. The other side 101 of the solenoid coil 98 is connected to a contact 102 of a normally opened push button switch 103 by a lead 104. The other contact 105 of the push button switch 103 is interconnected to the neutral lead N by a lead 106.

The lead 93 has a switch 107 therein which will not permit electrical current to flow through the lead 93 until an oven door latch member 108 is disposed in its latching position.

The operation of the control system 16 illustrated in FIGURE 1A utilizing the temperature sensing unit 18 of this invention will now be described.

When the selector knob 90 is disposed in a position to permit control of the heater means 13 for normal cooking operations, the switch blade 89 is disposed between the switch contacts 86 and 91 so that the temperature sensing unit 18 does not effect the operation of the heater means 13 regardless of the temperature being sensed thereby.

However, when the knob 90 is disposed in a "keep warm" position thereof, the switch blade 89 is placed against the contact 91 whereby the operation of the heater means 13 is thermostatically controlled by the unit 18 through the switch means 30. In particular, as long as the oven 13 has a temperature below the preselected opening temperature of the switch means 30, as set by the adjusting member 73A thereof, the end means 27 of the rod means 25 of the unit 18 holds the lever member 48 of the lever means 31 in such a position that the plunger 62 of the switch means 30 holds the contact 71A in electrical contact with the contact 70A so that the heater means 13 is placed across the power leads $L^1$ and $L^2$ to heat the oven 11.

When the temperature of the oven 11 exceeds the set "keep warm" temperature of the switch 30, such as 170° F. or the like, the end 20 of the tube means 19 of FIGURE 2 has moved to the left a distance to carry the end 27 of the rod means 25 to a position wherein the lever member 48 causes the plunger 62 to move the contact 71A away from the contact 70A to terminate the flow of current to the heater means 13.

In this manner, the unit 18, through the switch means 30, cycles the heater means 13 on and off to tend to maintain the temperature in the oven 11 at the non-cooking and warmth retaining temperature.

When the housewife or the like desires to operate the control system 16 for a burn-off cleaning operation of the oven 11, the housewife or the like turns the selector knob 90 to position the switch blade 89 against the contact 87 whereby the operation of the heater means 13 is adapted to be placed under the control of the unit 18 by means of the switch means 28 thereof.

However, before the switch means 28 can accomplish the operation of the heater means 13 with the knob 90 in its "burn-off" position, the latch member 108 of the oven door must be disposed in its latching position to close the normally open switch 107 and before the latch member can be disposed in its latching position, the latch pin 97 must be moved to the right in FIGURE 1A. To cause the latch pin 97 to move to the right, the housewife or the like pushes in on the push button switch 103 to complete a circuit between the power lead $L^1$ and neutral lead N through the switch means 29. Since the switch means 29 only opens when the unit 18 senses a temperature above the highest cooking temperature of the oven 11, such as 600° F. or the like as set by the adjusting member 73 of the switch means 29, the plunger 61 is maintaining the contact 71 against the contact 70 so that the coil 98 can be energized when the button 103 is pushed in to move the latch pin 97 to the right in FIGURE 1A and permit the oven door latch member 108 to be moved to its door latching position. With the door latch member in its latched position, the door latch member 108 permits current to flow through the lead 93 as the switch 107 is now closed whereby the switch 28 now controls the operation of the heater means 13.

In particular, as long as the temperature of the oven 11 is below the burn-off temperature as set by the adjusting member 53, such as 950° F., the contacts 41 and 42 on the bridging member 59 are in electrical contact with the contacts 43 and 44 so that the heater means 13 is placed across the power source leads $L^1$ and $L^2$ to heat the oven 11.

When the temperature of the oven 11 exceeds the burn-off temperature setting of the switch 28, such as 950° F., the unit 18 causes the end 27 of the rod means 25 to move to the left in FIGURE 2 a distance sufficient to cause the lever member 32 to snap to its open position of FIGURE 3 and terminate the operation of the heater means 13 until the temperature of the oven 11 again falls below the set burn-off temperature.

In this manner, it can be seen that the switch means 28 is cycled between its open and closed positions by the unit 18 to thermostatically maintain the temperature in the oven 11 at the correct burn-off temperature for the selected cleaning operation thereof.

As the temperature of the oven 11 begins to initially heat up during the burn-off operation, it can be seen that a temperature is reached wherein the switch means 29 will open even though the heater means 13 is still operating by the switch means 28 being closed. With the contact 71 of the switch 29 now moved away from the contact 70, it can be seen that a person cannot push in on the button 103 to tend to move the latching pin 97 to the right to permit unlatching of the oven door unless the temperature of the oven 11 again falls below the temperature which will permit the switch means 29 to close, such as 600° F. or the like, whereby the switch 29 prevents the oven door from being opened while the temperature of the oven 11 is above 600° F. during a cleaning operation.

The selector knob 90 can be automatically or manually turned to its "off" position after a certain length of time of operation of the oven 11 during the above described cleaning operation thereof.

Therefore, it can be seen that the temperature sensing unit 18 of this invention controls not only the high temperature burn-off operation of the heater means 13 of the control system 16, but also controls the safety feature of maintaining the oven door in its latched position and controls the operation of the heating means 13 during a non-cooking and warmth retaining operation of the oven 11.

Further, it can be seen that the switch means 28 can be adjusted by the adjusting member 53 to cause the switch 28 to open at a temperature selected whereby the burn-off temperature for the oven 11 can be adjusted. Such adjustment of the member 53 relative to the lever member 48 also will adjust the temperature sensed in the oven 11 which will cause opening of the switch means 29 and 30. Therefore, the adjusting member 53 will collectively adjust the switch means 28–30. However, the switch means 29 and 30 can be further individually adjusted by the adjusting means 73 and 73A thereof to change the temperature of operation thereof.

In addition, suitable mechanical means can be interconnected to the adjusting members 53, 73 and 73A so that the members 53, 73 and 73A can be manually adjusted at the control panel 12 of the apparatus 10 by the housewife or the like.

As previously stated, the unit 18 of this invention can be utilized to control only the electrical switch means 28 by itself or the switch means 28 in combination with either the switch means 29 or the switch means 30 as desired.

For example, reference is made to FIGURE 9 wherein the unit 18 of this invention has one of the switch means 29 or 30 thereof removed and a like switch means 107 is utilized either for the oven door latch means or for the non-cooking warmth retaining operation as desired. Of course, the switch means 107 can be utilized to control other parts of the apparatus 10, as desired.

In FIGURE 10, the unit 18 has both switch means 29 and 30 eliminated whereby the unit 18 merely controls the previously described switch means 28.

Therefore, it can be seen that not only does this invention provide an improved control means for a cooking apparatus or the like, but also this invention provides improved parts for such a cooking apparatus or the like.

While the form of the invention now preferred has been disclosed as required by statute, other forms may be used, all coming within the scope of the claimed subject matter which follows.

What is claimed is:

1. In combination, a rod and tube temperature sensing unit having end means movable in response to sensed temperature changes, a first electrical switch carried by said unit, lever means carried by said unit and operatively interconnecting said end means to said first switch whereby movement of said end means in one direction from a first predetermined position thereof opens said first switch and movement of said end means in the other direction from said first position closes said first switch, and a second electrical switch carried by said unit, said lever means operatively interconnecting said end means to said second switch whereby movement of said end means in one direction from a second predetermined position thereof opens said second switch and movement of said end means in the other direction from said second position closes said second switch said lever means carrying contact means of said first switch at one end thereof and being engageable with said end means at the other end thereof, said lever means being engageable with said second switch at a point intermediate said ends of said lever means.

2. A combination as set forth in claim 1 wherein first means are provided for adjusting said first position that operates said first switch.

3. A combination as set forth in claim 1 wherein second means are provided for adjusting said second position that operates said second switch.

4. A combination as set forth in claim 1 wherein said lever means includes a lever member engaged by said end means of said unit whereby said lever member follows the movement of said end means, said second switch having an operating plunger therefor engageable by said lever member.

5. A combination as set forth in claim 4 wherein said lever member carries an adjusting member that is engaged by said end means of said unit and is adjustable relative to lever member whereby said adjusting member determines said first position and said second position.

6. A combination as set forth in claim 5 wherein said second switch carries an adjusting member to determine the movement of said plunger relative thereto that opens and closes said second switch.

7. A combination at set forth in claim 1 and including a third electrical switch carried by said unit, said lever means operatively interconnecting said end means to said third switch whereby movement of said end means in one direction from a third predetermined position thereof opens said third switch and movement of said end means in the other direction from said third position closes said third switch.

8. A combination as set forth in claim 7 and including adjusting means for selectively adjusting said predetermined positions independently of each other or collectively.

9. In a cooking apparatus having an oven provided with heating means therefor and a door latching means for an oven door thereof, the improvement comprising a rod and tube temperature sensing unit having end means movable in response to sensed temperature changes, a first electrical switch carried by said unit, lever means carried by said unit and operatively interconnecting said end means to said first switch whereby movement of said end means in one direction from a first predetermined position thereof opens said first switch and movement of said end means in the other direction from said first position closes said first switch, and a second electrical switch carried by said unit, said lever means operatively interconnecting said end means to said second switch whereby movement of said end means in one direction from a second predetermined position thereof opens said second switch and movement of said end means in the other direction from said second position closes said second switch, said first switch controlling the operation of said heating means during a high temperature burn-off cleaning operation of said oven, said second switch controlling said door latching mechanism for said oven during said oven burn-off cleaning operation.

10. In a cooking apparatus as set forth in claim 9, first means are provided for adjusting said first position that operates said first switch.

11. In a cooking apparatus as set forth in claim 9, second means are provided for adjusting said second position that operates said second switch.

12. In a cooking apparatus as set forth in claim 9, said lever means includes a lever member engaged by said end means of said unit whereby said lever member follows the movement of said end means, said second switch having an operating plunger therefor engageable by said lever member.

13. In a cooking apparatus as set forth in claim 12, said lever member carrying an adjusting member that is engaged by said end means of said unit and is adjustable relative to said lever member whereby said adjusting member determines said first position and said second position.

14. In a cooking apparatus as set forth in claim 13, said second switch carries an adjusting member to determine the movement of said plunger relative thereto that will open and close said second switch.

15. In a cooking apparatus as set forth in claim 9, a third electrical switch carried by said unit, said lever means operatively interconnecting said end means to said third switch whereby movement of said end means in one direction from a third predetermined position thereof opens said third switch and movement of said end means in the other direction from said third position closes said third switch, said third switch controlling the operation of said heater means during a non-cooking and warmth retaining operation of said oven.

16. In a cooking apparatus as set forth in claim 15, adjusting means for selectively adjusting said predetermined positions independently of each other or collectively.

17. A rod and tube temperature sensing unit comprising a tube means having opposed ends, a rod means disposed in said tube means and having opposed ends with one of said ends moving in unison with one of said ends of said tube means, said tube means and rod means having different coefficients of thermal expansion and contraction whereby the other end of said rod means moves relative to the other end of said tube means in response to different sensed temperatures, said rod means having at least a portion of the length thereof provided with the external peripheral surface thereof disposed out of sliding contact with the inner peripheral surface of said tube means, and wire means coiled on said portion of said rod means to hold said portion out of sliding contact with said tube means, said wire means providing substantially line contact with said inner peripheral surface of said tube means in a transverse cross-section of said unit.

18. A unit as set forth in claim 17 wherein said wire means is carried by said portion of said rod means by the natural resiliency of said wire means to coil thereon.

19. A unit as set forth in claim 17 wherein said portion of said rod means comprises a plurality of ceramic members disposed in abutting and coaxially aligned relation.

20. A unit as set forth in claim 19 wherein each ceramic member has a pair of spaced wire means thereof adjacent the ends of the respective member.

References Cited

UNITED STATES PATENTS

| 1,000,661 | 8/1911 | Beers et al. | 200—137 |
| 1,651,972 | 12/1927 | Smalley | 200—137 |
| 2,104,848 | 1/1938 | Clark | 200—137 |
| 2,221,907 | 11/1940 | Bondurant | 200—137 |
| 2,266,721 | 12/1941 | Christiansen | 73—362 X |
| 2,520,370 | 8/1950 | Offutt | 200—140 |
| 2,853,582 | 9/1958 | Rosen | 200—137 |
| 2,981,812 | 4/1961 | Piteo et al. | 200—116 X |
| 3,004,123 | 10/1961 | Cannon | 200—137 |

FOREIGN PATENTS 967,394  8/1964  Great Britain.

BERNARD A. GILHEANY, *Primary Examiner.*

R. COHRS, *Assistant Examiner.*

U.S. Cl. X.R.

337—1